Sept. 18, 1928.  A. SCHWINDENHAMMER  1,685,007

WIRE REEL

Filed July 16, 1926

Albert Schwindenhammer
INVENTOR

BY Victor J. Evans
ATTORNEY

WITNESS J.T.L. Wright

Patented Sept. 18, 1928.

1,685,007

UNITED STATES PATENT OFFICE.

ALBERT SCHWINDENHAMMER, OF PEORIA, ILLINOIS.

WIRE REEL.

Application filed July 16, 1926. Serial No. 122,941.

This invention relates to a wire reel, the general object of the invention being to provide means for facilitating the unwinding of barbed wire and the like from a spool.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
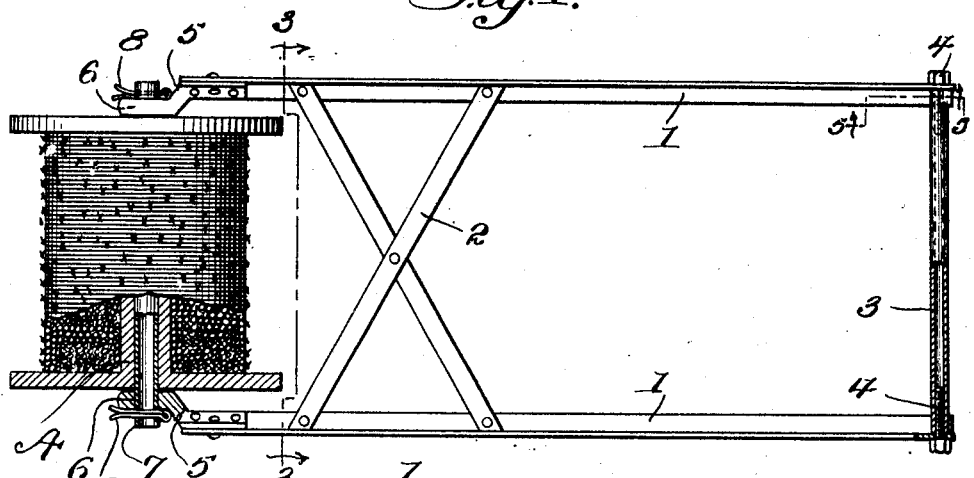
Figure 1 is a plan view, with parts in section, of the invention and showing the same in use.
Figure 3:
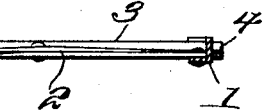
Figure 3 is a section on line 3—3 of Figure 1.
Figure 4:
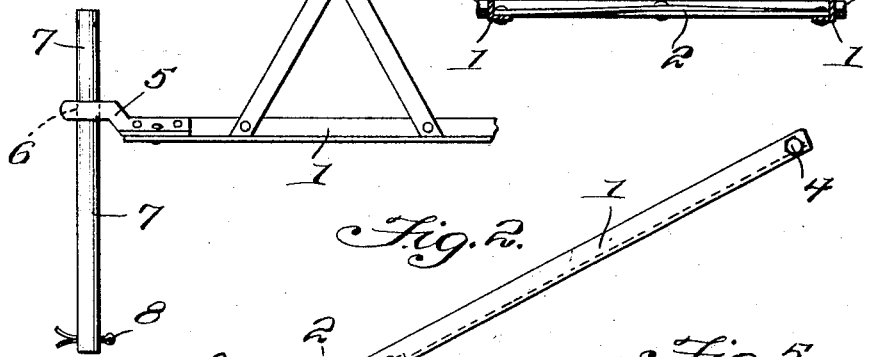
Figure 4 is a plan view of one end of the reel showing the spool holding shaft partly removed therefrom.
Figure 2:
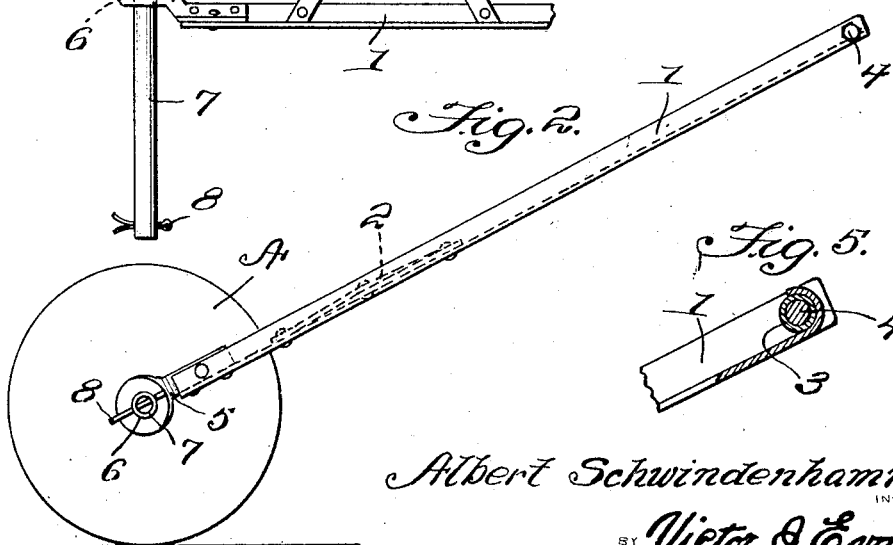
Figure 2 is a side view.
Figure 5:
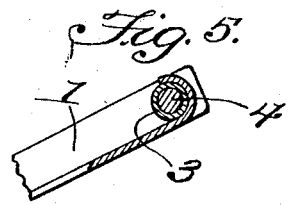
Figure 5 is a section on line 5—5 of Figure 1.

In these views, 1 indicates a pair of side bars which are preferably formed of angle iron and these bars are connected together intermediate their ends by the cross braces 2. A pipe 3 forms the handle of the device and is connected with the upper ends of the bars 1 by the bolts 4 which pass through holes in said ends and enter the ends of the tube. A member 5 of considerable strength is riveted to the lower end of each bar 1 and each member is provided with an offset portion which has a hole 6 therein to receive a pipe 7, the pipe being held in position by the cotter pins 8 passing through holes in its ends. By making the members 5 with the offset portions, the ends of the pipe 7 do not project beyond the frame formed by the device. The spool A, carrying the barbed wire, is placed on the pipe 7 so that it can be rolled along the ground by either pushing or pulling upon the handle 3 of the device, as shown in Figure 2.

With this device, one man can easily unwind barbed wire from a spool and when the spool is empty, it can be easily removed from the device and a new spool put in its place.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a pair of side bars, a handle connecting one end of each bar with an end of the opposite bar, a casting fastened to the other end of each bar and having an inwardly extending offset portion having a hole therein, said castings forming extensions of the side bars, a shaft passing through the holes in the two castings, the length of the shaft being less than the width between the outer sides of the side bars, pins passing through the ends of the shaft for holding the shaft in place, a reel rotatably mounted on a shaft and braces connecting the side bars together.

In testimony whereof I affix my signature.

ALBERT SCHWINDENHAMMER.